(12) United States Patent  (10) Patent No.: US 8,701,586 B2
Harder et al.  (45) Date of Patent: Apr. 22, 2014

(54) MAGNETIC WEAR SAVING DEVICE

(75) Inventors: Craig E. Harder, Edmonton (CA); Murray A Smith, Toronto (CA)

(73) Assignee: Raptor Mining Products Inc., Edmonton, Alberta (CA)

( * ) Notice: Subject to any disclaimer, the term of this patent is extended or adjusted under 35 U.S.C. 154(b) by 630 days.

(21) Appl. No.: 12/929,652

(22) Filed: Feb. 7, 2011

(65) Prior Publication Data

US 2011/0129638 A1    Jun. 2, 2011

Related U.S. Application Data

(63) Continuation-in-part of application No. 11/650,475, filed on Jan. 8, 2007, now abandoned.

(51) Int. Cl.
*G01D 21/00* (2006.01)

(52) U.S. Cl.
USPC .......................................... 116/208; 116/209

(58) Field of Classification Search
USPC ............ 116/204, 208–209; 248/309.4; 7/116; 294/65.5; 73/762, 431, 866.5
See application file for complete search history.

(56) References Cited

U.S. PATENT DOCUMENTS

| | | | | |
|---|---|---|---|---|
| 2,326,774 A * | 8/1943 | Freedman | | 30/70 |
| 3,675,169 A * | 7/1972 | Scholl | | 335/205 |
| 3,823,989 A * | 7/1974 | Boggs et al. | | 305/118 |
| 4,051,007 A * | 9/1977 | Hossle | | 204/196.07 |
| 4,909,088 A * | 3/1990 | Tsals | | 73/862.335 |
| 5,388,331 A * | 2/1995 | Doroodian-Shoja Siamak | | 30/41.7 |
| 5,603,161 A * | 2/1997 | Welsh | | 30/41.7 |
| 6,129,297 A * | 10/2000 | Sawant et al. | | 241/101.3 |
| 6,932,891 B2 * | 8/2005 | Wigg et al. | | 204/196.06 |
| 8,523,291 B2 * | 9/2013 | Urgu | | 301/43 |
| 2009/0211421 A1 * | 8/2009 | Lier et al. | | 83/522.27 |
| 2013/0115034 A1 * | 5/2013 | Subrt | | 414/685 |

* cited by examiner

*Primary Examiner* — Hezron E Williams
*Assistant Examiner* — Tania Courson

(57) ABSTRACT

A magnetic wear saving device including a resilient member and a magnetic member for protecting a wear surface on a material handling device. The magnetic wear saving device further including a release means provided within a bore formed through and along the central axes of the resilient member and the magnetic member for removing the magnetic wear saving device from the wear surface of the material handling device. There may be a single shear plate with several recesses for the magnetic wear saving devices, or the wear surface of the equipment itself may be integrally formed with recesses for the magnetic wear saving devices.

19 Claims, 13 Drawing Sheets

DETAIL C-C

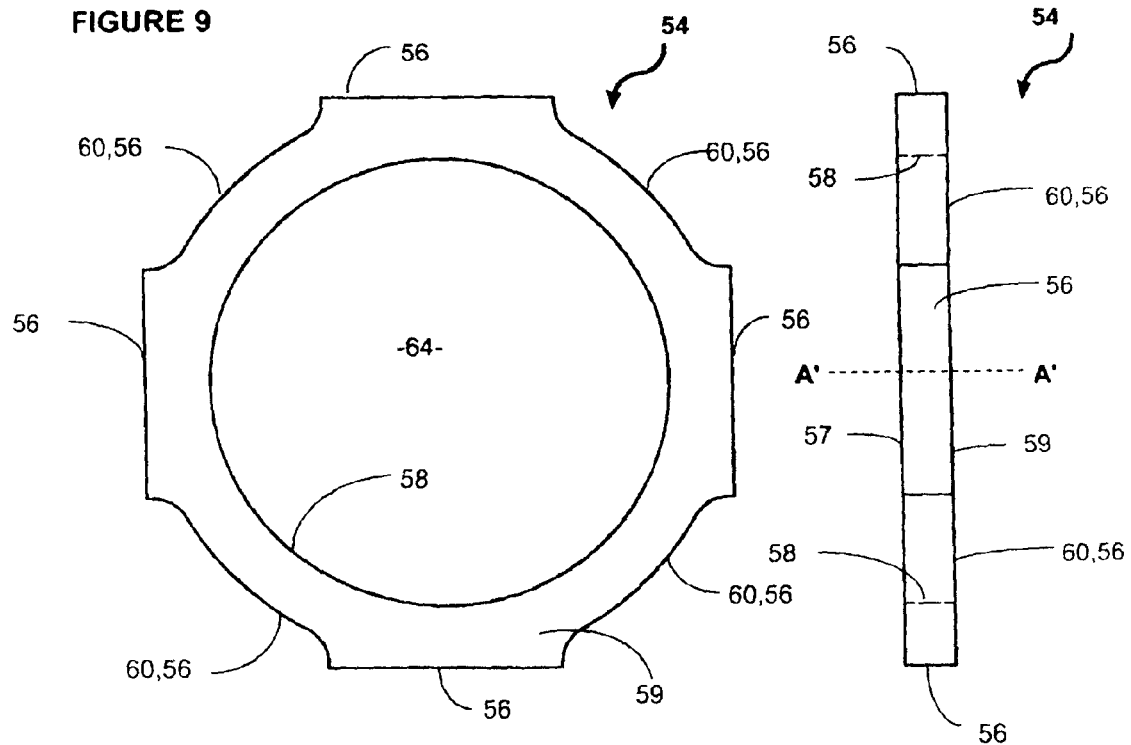
FIGURE 9
FIGURE 10
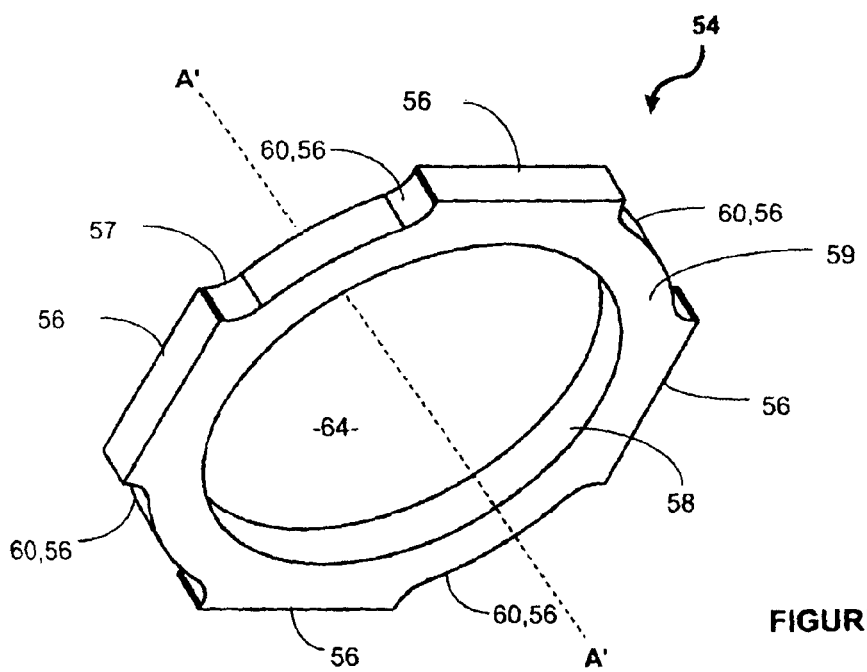
FIGURE 11

DETAIL D-D

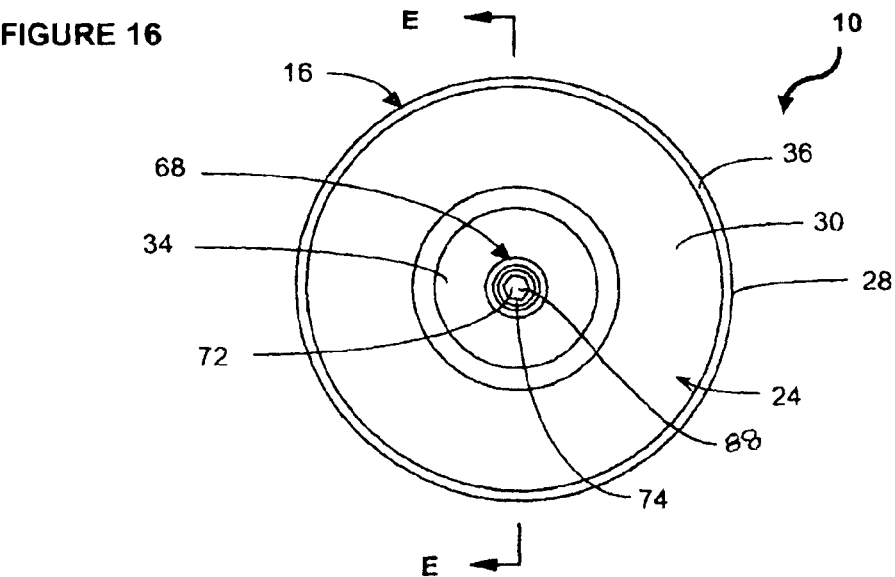
FIGURE 16
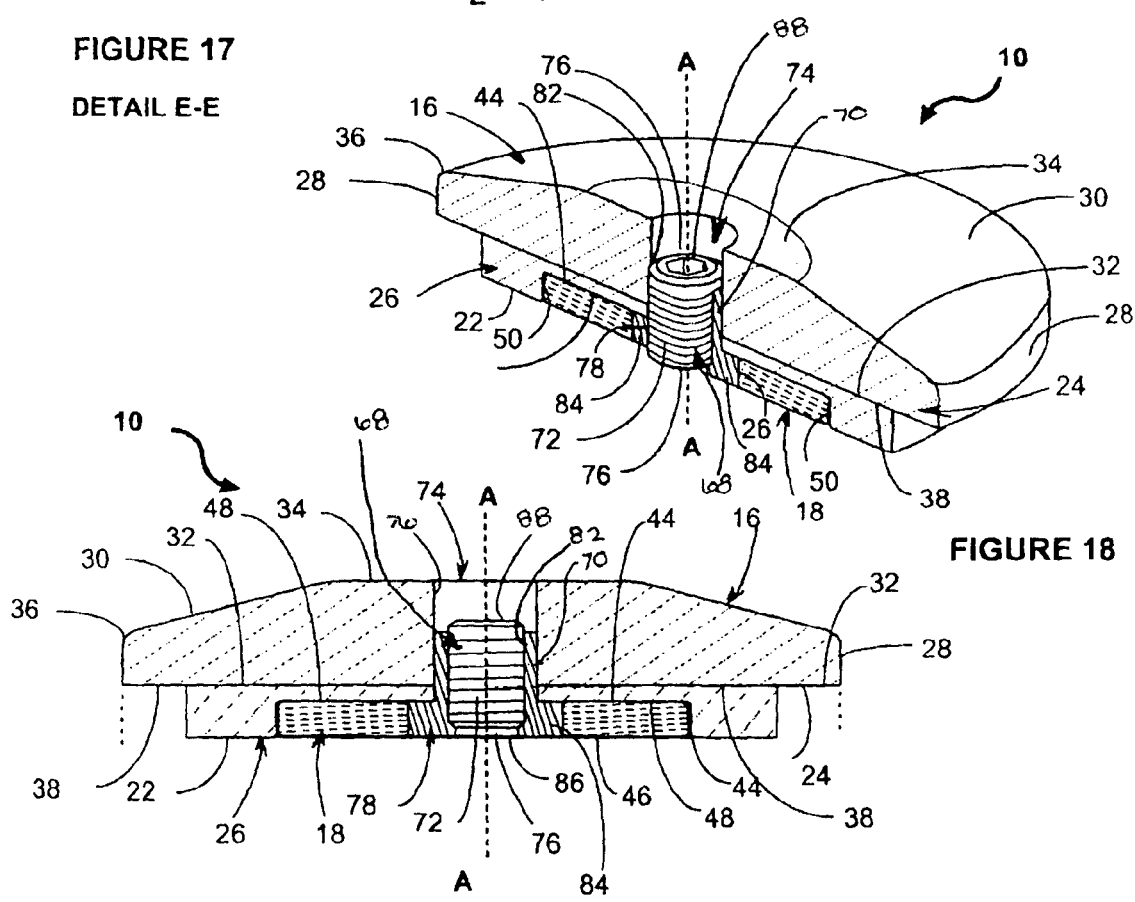
FIGURE 17
DETAIL E-E
FIGURE 18

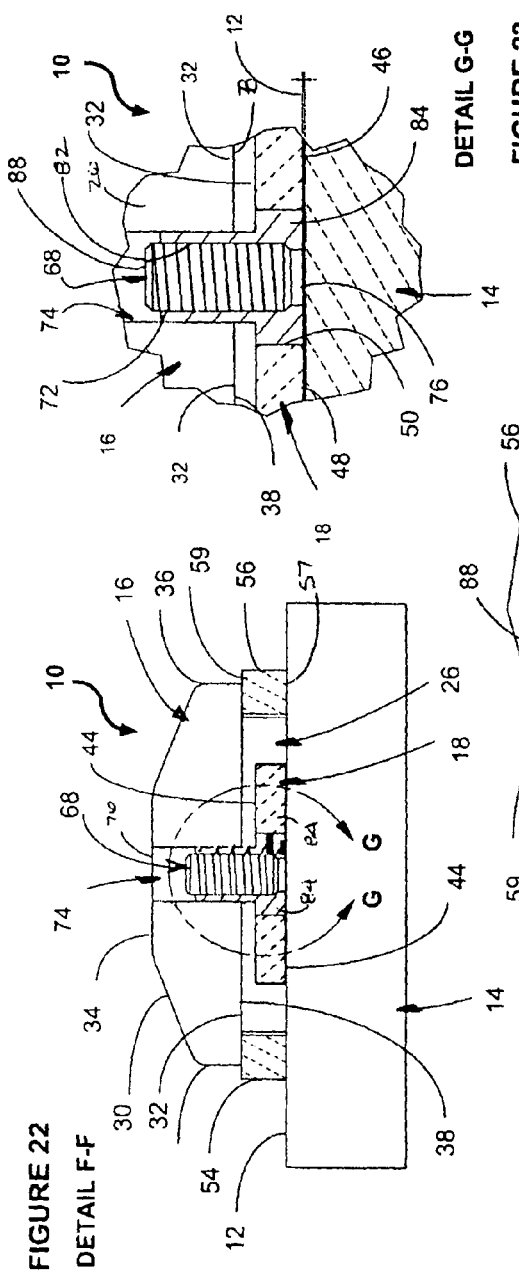
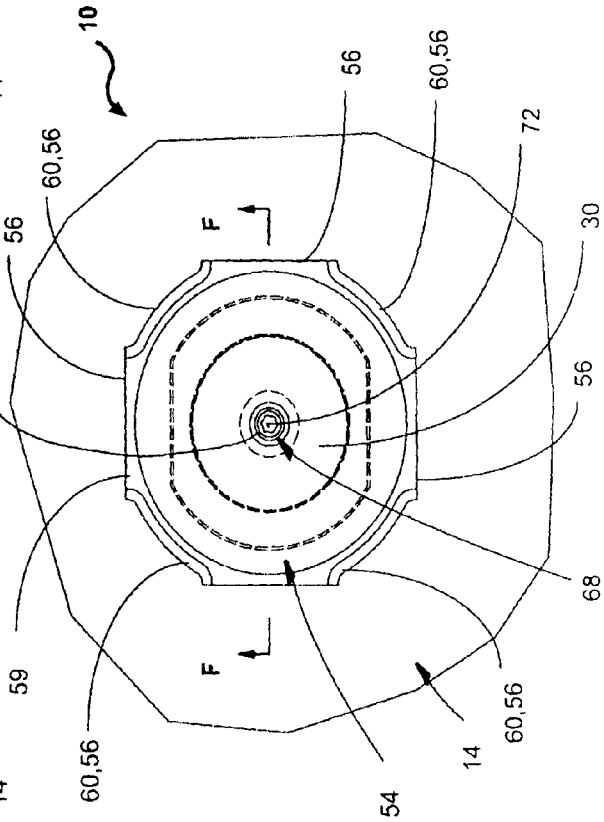
FIGURE 22
DETAIL F-F
DETAIL G-G
FIGURE 23
FIGURE 21

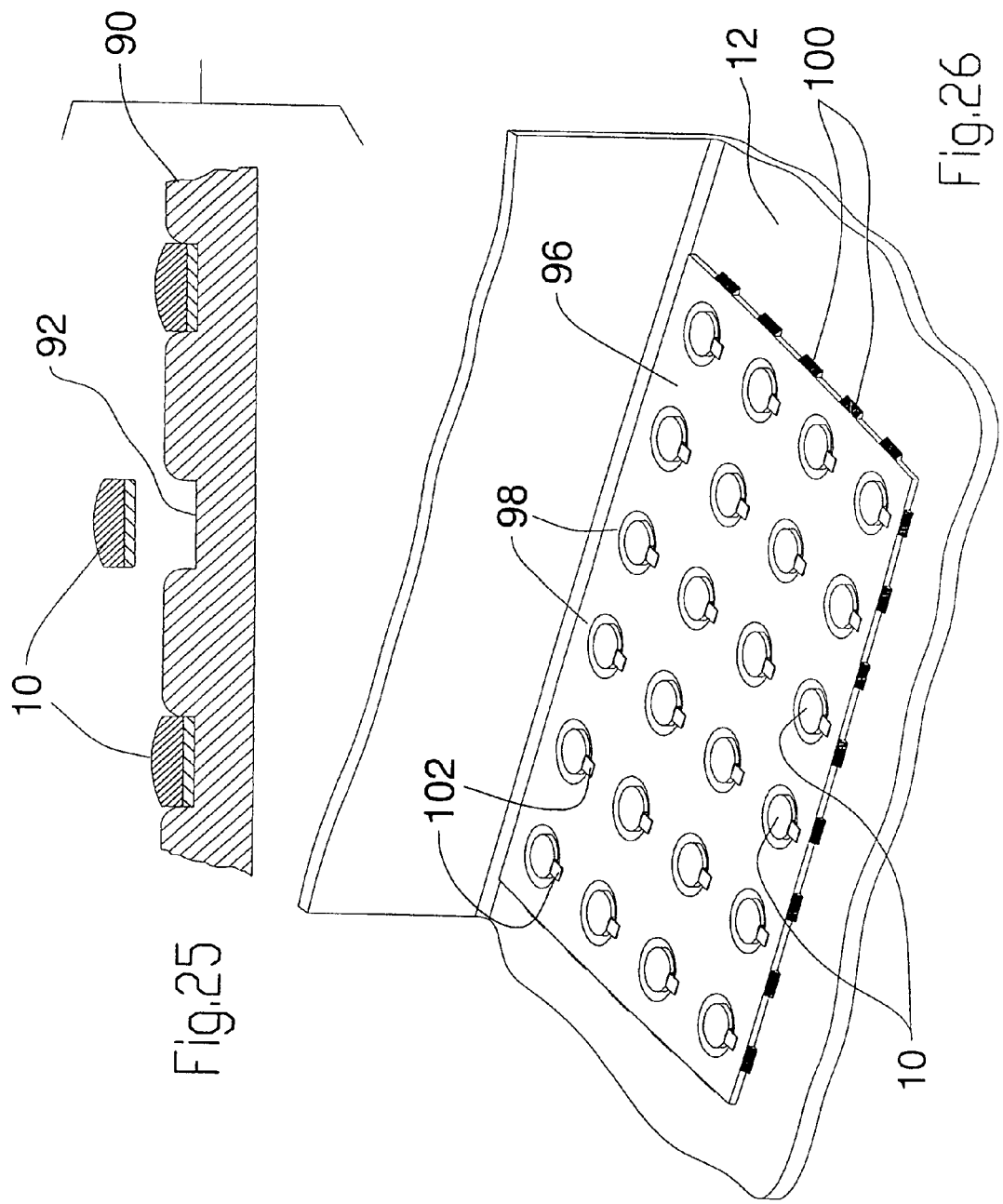

MAGNETIC WEAR SAVING DEVICE

This application is a Continuation in Part of Ser. No. 11/650,475, filed Jan. 8, 2007 now abandoned, Title Magnetic Wear Saving Device, inventor Craig E Harder et al.

FIELD OF THE INVENTION

The present invention relates to a wear saving device, and more particularly to a magnetic wear saving device for use in mining and construction applications which can be releasably secured to a wear surface on a material handling device to minimize damage resulting from abrasive and impact forces.

BACKGROUND OF THE INVENTION

It is well known that material handling devices are subjected to considerable impact and abrasive forces, especially when used in mining and construction applications. In order to minimize the damage to material handling devices or prolong the life of such devices, many of the components of the equipment are formed of high strength materials, such as hardened alloy steel. Despite the use of such high strength materials, the impact and abrasion cause by the intrusion of rocks, soil and water inevitably result in permanent damage and fatigue to the components of the material handling device. Given the time and cost associated with refurbishing the damaged portion of the material handling device, owners commonly opt to purchase expensive replacement components.

Accordingly, there is a need for a magnetic wear saving device that is capable of being releasably secured to the material handling device to minimize the deleterious damage caused by abrasive and impact forces to the wear surface of material handling device.

SUMMARY OF THE INVENTION

The present invention is directed to a magnetic wear saving device for protecting a wear surface on a material handling device. The magnetic wear saving device includes a resilient member and a magnetic member. The resilient member has an upper portion and a lower portion integrally formed together. The upper portion having a top exterior surface and the lower portion having a bottom surface for contacting with the wear surface of the material handling device. The bottom surface being formed with a recess. The magnetic member is received within the recess and is coupled to the resilient member. The magnetic member has an outer magnetic surface for releasably securing the resilient member to the wear surface of the material handling device. The central axis of the resilient member is aligned with a central axis of the magnetic member. The resilient member is manufactured from a ferromagnetic material. The magnetic member is manufactured from a rare earth neodymium-iron boron magnetic material. The wear saving devices may be placed in a mosaic or arranged together to provide protective coverage over a larger area of the wear surface.

The magnetic wear saving devices are used in conjunction with respective shear plates. The shear plate including an outer edge and an inner circular edge. The outer edge being constructed with one or more notched edges. The inner circular edge defining an aperture for at least partially receiving the resilient member and the magnetic member therein. The one or more notched edges along the outer edge are dimensioned to receive one or more fillet welds. The fillet welds secure the one or more notched edges to the wear surface of the material handling device. The shear plate further including a bottom shear surface for positioning the shear plate adjacent to the wear surface of the material handling device, and a top shear surface for positioning the shear plate adjacent to the resilient member of the magnetic wear saving device.

In the present invention, the upper portion and the lower portion are adapted to be fixedly connected to each other. The upper portion has an interior surface formed inwardly of the exterior surface. The lower portion has a top surface formed inwardly of the bottom surface and adjacent to the interior surface of the upper portion. The resilient member has a generally cylindrical outer circumferential edge extending from the exterior surface of the upper portion to the bottom surface of the lower portion. The upper portion has a generally dome-like configuration formed by the exterior surface extending radially outwardly from a planar top edge to the outer circumferential edge.

The lower portion has a generally annular configuration formed by an inner circumferential edge and the outer circumferential edge, whereby the inner circumferential edge defining an opening of the recess and terminating at a planar recessed surface.

In the present invention, the magnetic wear saving device has a generally cylindrical shape constructed with an outer magnetic surface, an inner magnetic surface and a circumferential magnetic edge. The outer magnetic surface is positioned parallel to the wear surface. The inner magnetic surface is positioned parallel to the recessed surface. The circumferential magnetic edge is positioned parallel to the inner circumferential edge of the lower portion of the resilient member. The circumferential magnetic edge is spaced apart from the inner circumferential edge of the lower portion a distance less than 1.0 millimeters. Alternatively, the circumferential magnetic edge is spaced apart from the inner circumferential edge of the lower portion a distance less than 0.5 millimeters. Similarly, the outer magnetic surface is spaced apart from the wear surface of the material handling device a distance less than 1.0 millimeters. Alternatively, the outer magnetic surface is spaced apart from said wear surface of said material handling device a distance less than 0.5 millimeters.

The shear plates may be supplied as individual plates one for each magnetic wear saving device. Or there may be one or more larger plates, each accommodating a plurality of magnetic wear saving devices. The shear plate will include an outer edge and an inner circular edge. The outer edge is preferably constructed with one or more notched edges. The inner circular edge defines an aperture for at least partially receiving the resilient member and the magnetic member therein. The one or more notched edges along the outer edge are dimensioned to receive one or more fillet welds. The fillet welds secure the one or more notched edges to the wear surface of the material handling device. The shear plate further includes a bottom shear surface for positioning the shear plate adjacent to the wear surface of the material handling device, and a top shear surface for positioning the shear plate adjacent to the resilient member of the magnetic wear saving device.

The invention is also directed to a magnetic wear saving device for use in conjunction with a release means. The release means is provided within a bore formed through and along the central axes of the resilient member and the magnetic member. The release means includes a cylinder member and a jack screw which is adapted to be threadably received within the cylinder member. The bore includes an upper bore and a lower bore having a greater cross-sectional area than the upper bore. The upper bore extending through the resilient member and the lower bore extending through the magnetic member. The cylinder member includes a tubular body having a threaded interior and an outer flange extending from the tubular body. The tubular body is dimensioned to be received within the upper bore and the outer flange being dimensioned to be received within the lower bore.

The jack screw is inserted into the upper bore and threadably advanced along the thread interior of the tubular body towards the lower bore. The advancement of the jack screw along the threaded interior and into wear surface in this manner causes the magnetic wear saving device to become removed from the wear surface of the material handling device.

Alternatively the shear plate can be provided with a notch adjacent the edge of each recess. The notch provides access for a lever tool such as a pry bar, to simply lever the magnetic wear saving device out of the recess.

BRIEF DESCRIPTION OF THE DRAWINGS

For a better understanding of the present invention, and to show more clearly how it may be carried into effect, reference will now be made, by way of example, to the accompanying drawings, in which:

FIG. 9 is a top plan view of a shear plate for use in conjunction with the magnetic wear saving device in accordance with a second embodiment of the invention;

FIG. 10 is a side view of the shear plate of FIG. 9;

FIG. 11 is a front perspective view of the shear plate of FIG. 9;

FIG. 16 is a plan view of a release means provided within the magnetic wear saving device in accordance with a third embodiment of the invention;

FIG. 17 is a perspective sectional view of the magnetic wear saving device along line E-E of FIG. 16 showing the components of the release means;

FIG. 18 is a side sectional view of the magnetic wear saving device along line E-E of FIG. 16 showing the components of the release means;

FIG. 21 is a plan view of the magnetic wear saving device secured to the wear surface of the material handling device using the shear plate and release means of the second and third embodiments of the present invention;

FIG. 22 is a side sectional view of the release means along the detail F-F of FIG. 17;

FIG. 23 is a side sectional view of the release means along the detail G-G of FIG. 21;

FIG. 25 is a section of the wear surface of a shovel for example, showing a further embodiment; and, FIG. 26 is a perspective of a further embodiment of unitary shear plate.

DETAILED DESCRIPTION OF THE INVENTION

Figure 1:
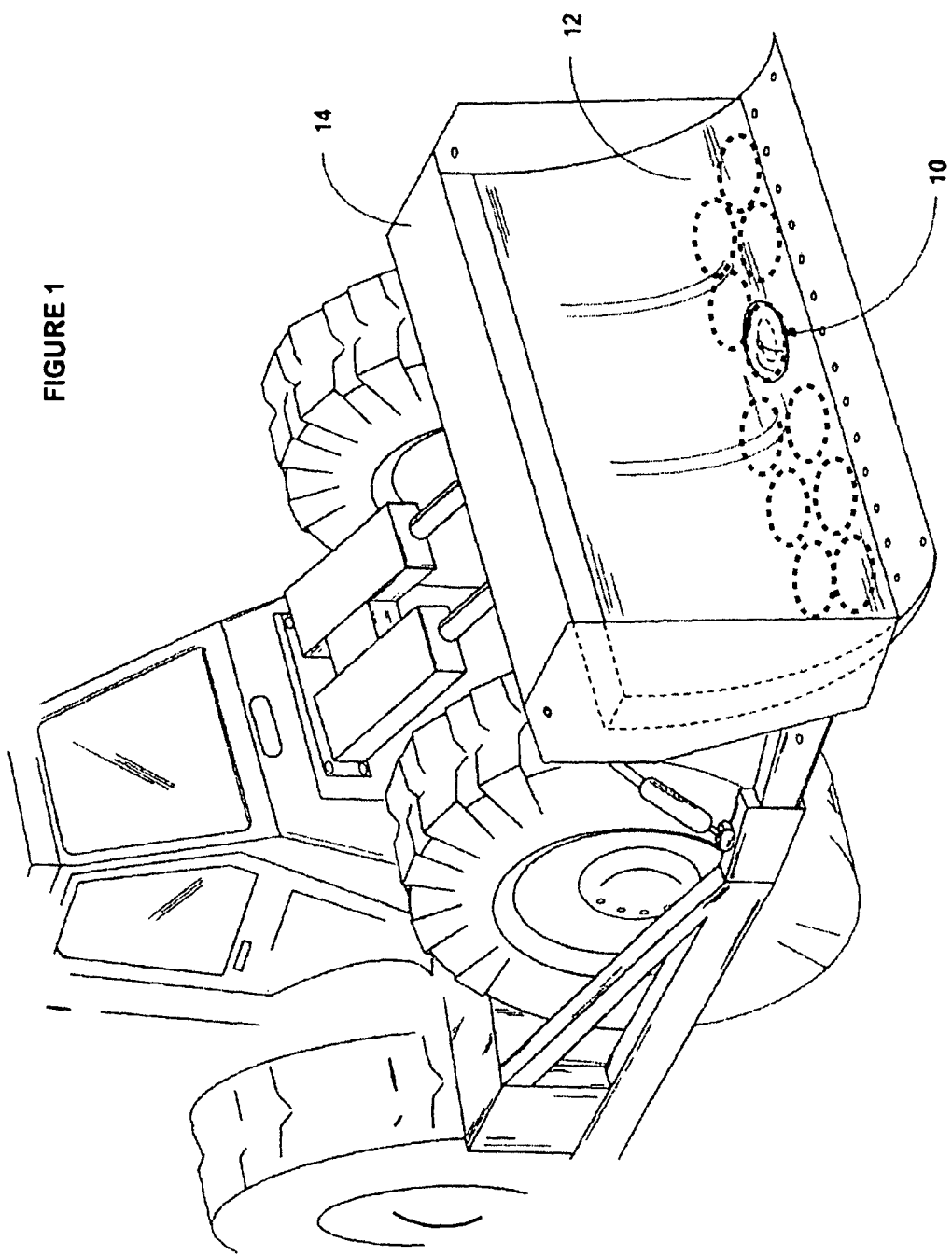
FIG. 1 is a perspective view of a magnetic wear saving device illustrated as a preferred embodiment of the invention, shown releasably secured to a wear surface on a material handling device, with numerous further such wear saving devices being shown in phantom, the wear saving devices may be in a mosaic or arranged together to provide a protective coverage over a larger area of the wear surface, and secured within shear plate rings.
Figure 2:
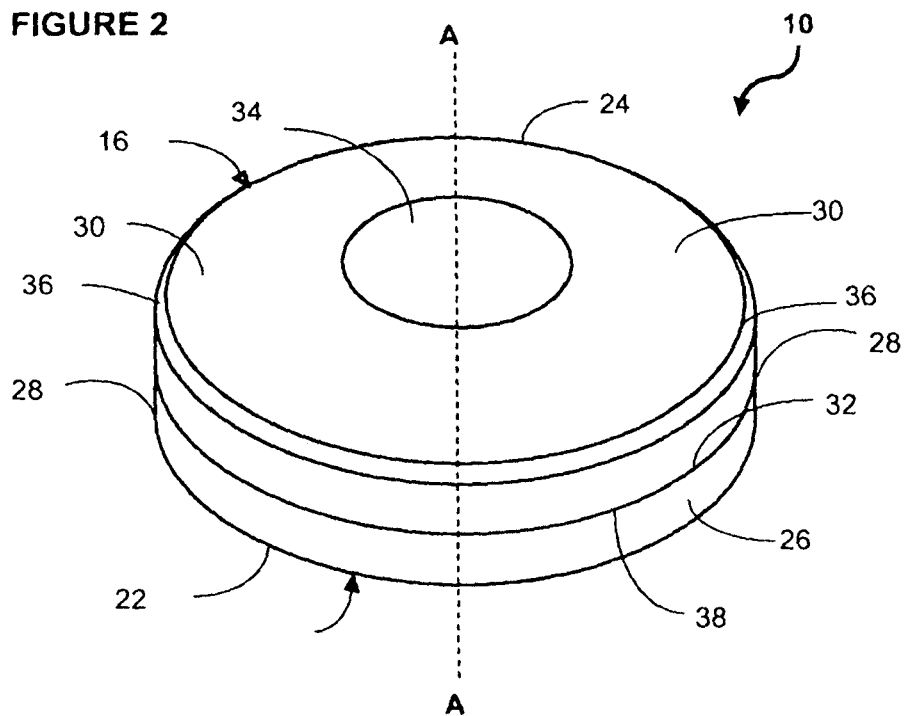
FIG. 2 is a front perspective view of the magnetic wear saving device of FIG. 1.
Figure 3:
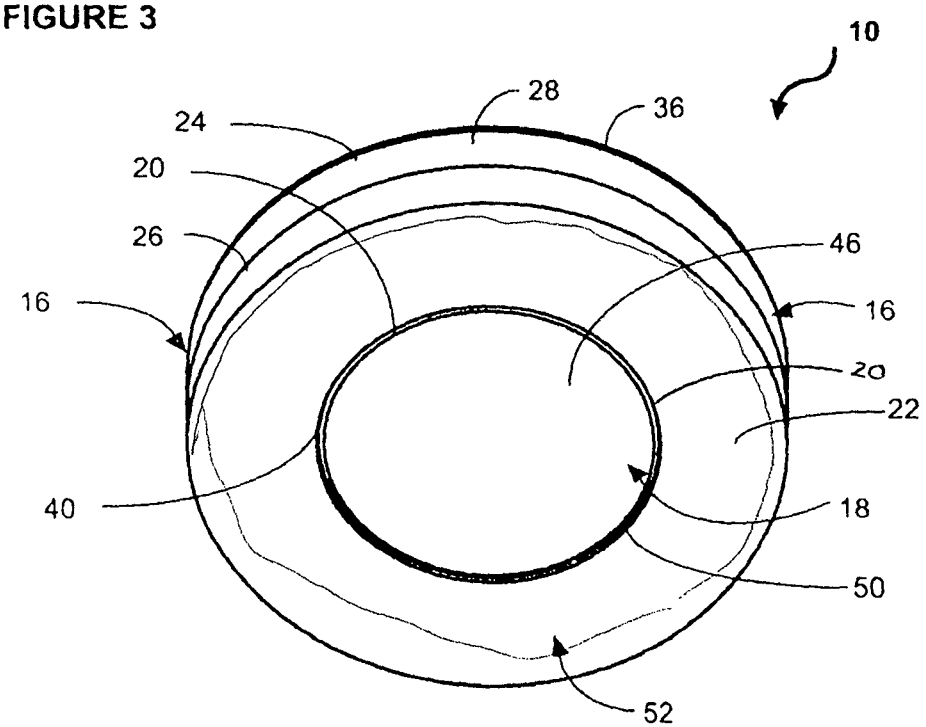
FIG. 3 is a bottom perspective view of the subject magnetic wear saving device showing the bottom surface and the magnetic member.

Reference is made to FIGS. 1-8 which illustrate a magnetic wear saving device 10 constructed in accordance with a preferred embodiment of the present invention. It will be understood that this device is what may be called a sacrificial device, intended to wear away during use, while saving the underlying piece of equipment to as great an extent as may be possible, from similar wear. The magnetic wear saving device 10 is designed to be releasably secured to a wear surface 12 on a material handling device 14 to minimize the deleterious effect of abrasive and impact forces on such material handling devices 14 in many mining and construction applications. It will be understood that a large number of such wear saving devices may, and usually will, be secured to a wear surface of a piece of equipment.

The wear saving devices 10 contain a portion at least of sacrificial material, and may be arranged in a mosaic or arranged together to provide protective coverage over a larger area of the wear surface.

During use the abrasion and impact of materials will wear away the sacrificial material of the wear saving devices. These can be replaced as they wear out. This will save the actual wear surface of the piece of equipment from damage and prolong the useful life of the piece of equipment.

For applications in rectangular-shaped material handling devices 14, or chutes or conveyor belts, it may be more advantageous to apply a plurality of rectangular wear saving devices 10 in a side-by-side configuration to ensure substantial coverage of the desired wear surface.

The magnetic wear saving device 10 is generally disc-shaped and includes a resilient member 16 and a magnetic member 18 arranged in a recess 20 formed in a bottom surface 22 of the resilient member 16. The recess 20 has a central axis A-A forming the center of the magnetic wear saving device 10 which is aligned with the central axis of the resilient member 16 and the magnetic member 18.

Figure 5:
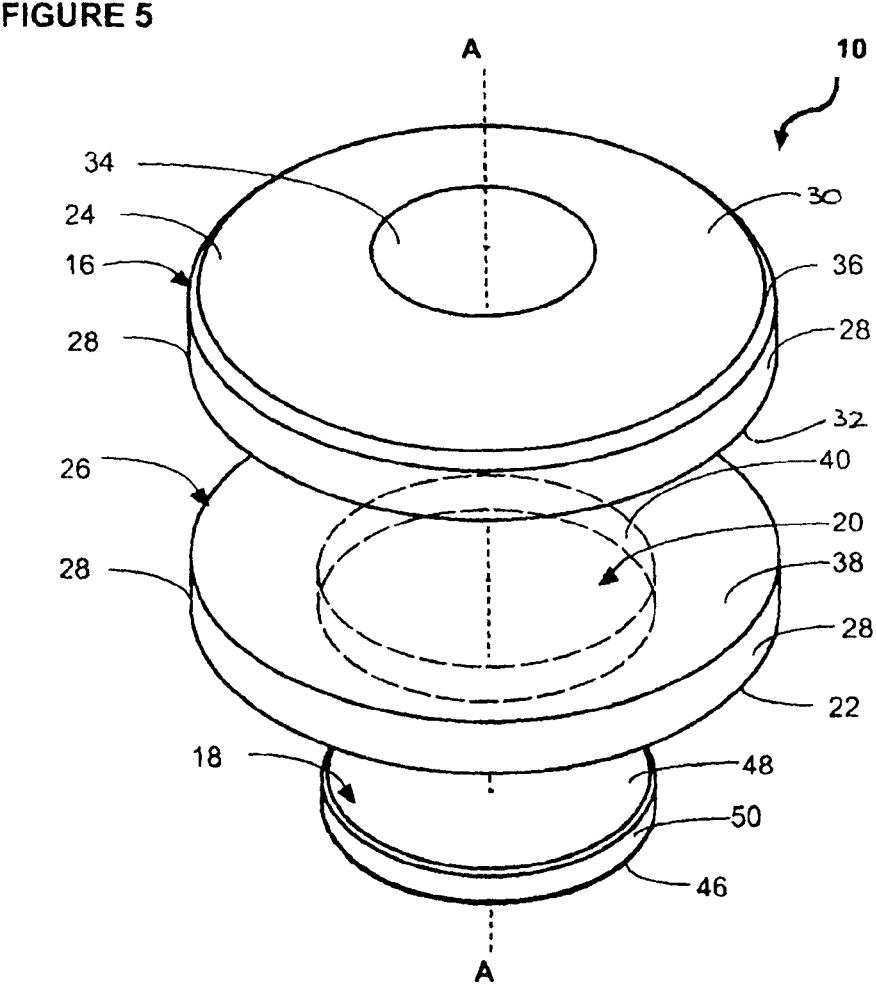
FIG. 5 is an exploded view of the components of the magnetic wear saving device in accordance with a preferred embodiment of the present invention.
Figure 6:
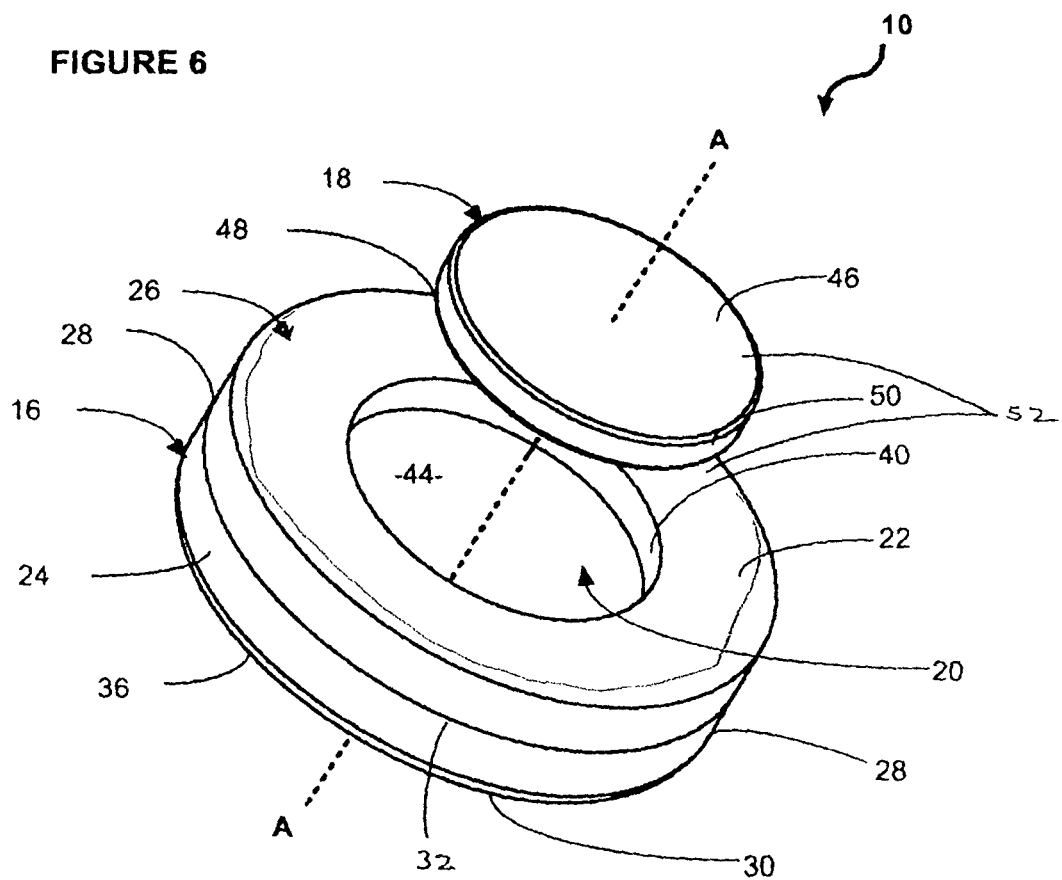
FIG. 6 is a side perspective view of the subject magnetic wear saving device showing the alignment of the resilient member and the magnetic member along the central axis A-A.
Figure 7:
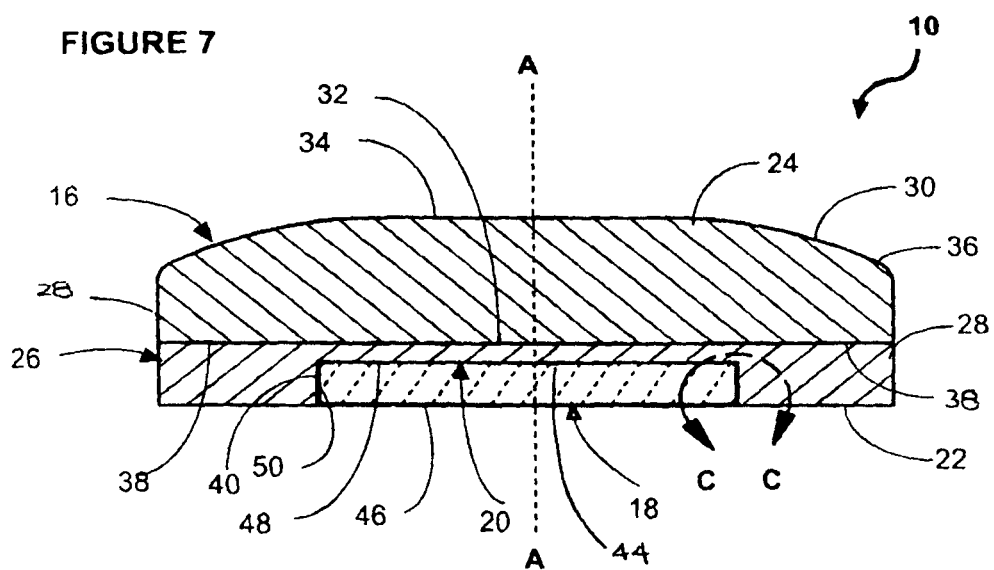
FIG. 7 is a sectional view of the magnetic wear saving device along line B-B of FIG. 4.

As shown in FIGS. 2-7, the resilient member 16 includes an upper portion 24 and a lower portion 26 which are integrally formed and together define a generally cylindrical outer circumferential edge 28. The upper portion 24 is constructed of a sacrificial material with a dome-like exterior surface 30 and a planar interior surface 32 which is formed inwardly of the exterior surface 30. The dome-like shape of the exterior surface 30 of the upper portion 24 tapers radially outward from a planar top edge 34 to the outer circumferential edge 28 of the resilient member 16 as shown in FIG. 7. The planar top edge 34 facilitates that stacking and storage of the magnetic wear saving devices 10 one above one another when not in use. Outer circumferential edge 28 is advantageously rounded at a corner edge 36 to minimize the occurrence of stress risers which may result in the magnetic wear saving device 10 becoming dislodged from the wear surface 12 of the material handling device 14 when in use. It should be understood that the outer circumferential edge 28 may be adapted to conform to any suitable shape or configuration of the magnetic wear saving device 10, and particularly the shape or configuration of the upper and lower portions 24, 26 of the magnetic wear saving device 10.

Figure 4:
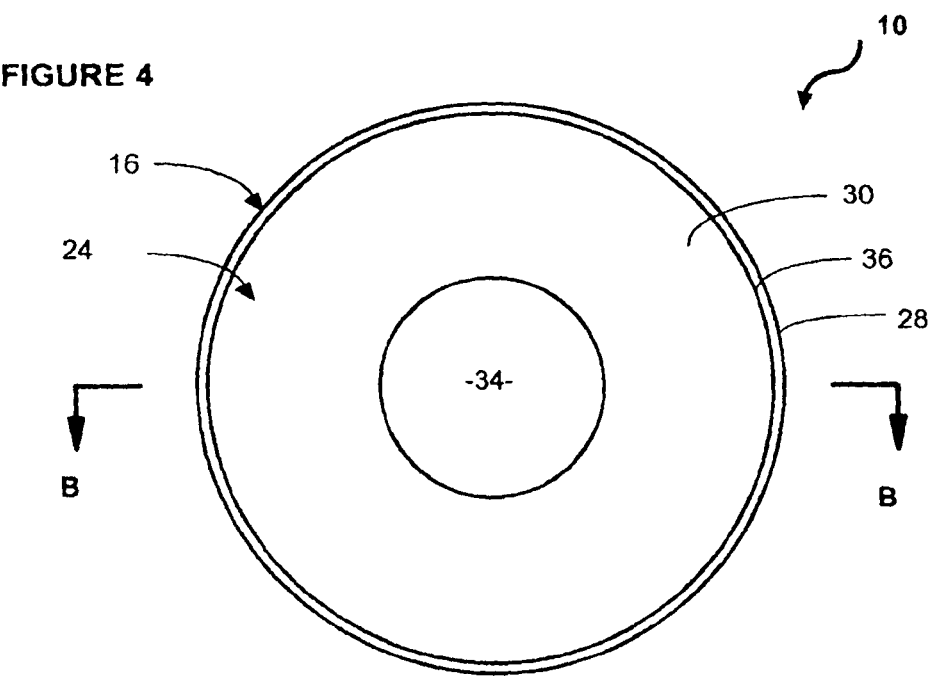
FIG. 4 is a top plan view of the subject magnetic wear saving device showing the planar top edge of the resilient member.

Referring to FIGS. 4-6, the lower portion 24 of the resilient member 16 is formed with a planar top surface 38 which is adjacent to and coplanar with the interior surface 32 of the upper portion 24. The bottom surface 22 is coplanar with the top surface 38 of the lower portion 26 and provides the surface upon which the magnetic wear saving device 10 can be positioned and removably secured to the wear surface 12 of any suitable material handling device 14. The bottom surface 22 is constructed with a generally annular shape defined by the outer circumferential edge 28 and an inner circumferential edge 40 which is aligned with the central axis A-A of the magnetic wear saving device 10. The inner circumferential edge 40 defines the opening of the recess 20 which is countersunk into the lower portion 26 along the central axis A-A and partially extends through the lower portion 26 between the bottom surface 22 and the top surface 38. The recess 20 is defined by the inner circumferential edge 40 which terminates at a planar recessed surface 44. The recess 20 will be of a size and shape suitable for receiving the magnetic member 18 therein.

As will be illustrated in greater detail below, at least a portion of the resilient member 16 is preferably manufactured from a ferromagnetic material so as to magnetically attract and retain the magnetic member 18 within the recess 20 when the magnetic wear saving device 10 is secured to a material handling device 14. The upper and lower portions 24, 26 of the resilient member 16 may be manufactured from different materials which are fixedly connected to each another by brazing, bonding or any other suitable connecting means along the interior surface 32 and top surface 38, respectively, to form a unitary resilient member 16. It should be understood that the resilient member 16 may be formed of any suitable material having suitable strength characteristics for resisting damage caused by wear abrasion, impact abrasion, corrosion or gouging abrasion typically encountered in mining and construction applications, for the purpose of affording protective coverage to the wear surface 12 protecting it from damage and abrasion. For example, the resilient member 16 may be manufactured from a steel, iron or polyurethane material or any other material suitable for use in mining and construction applications.

Referring to FIG. 6, the magnetic member 18 has a generally cylindrical shape constructed with an outer magnetic surface 46, an inner magnetic surface 48 and a circumferential magnetic edge 50. When arranged within the recess 20, the circumferential magnetic edge 50 is generally parallel to the inner circumferential edge 40 of the lower portion 26 of the resilient member 16. The outer magnetic surface 46 of the magnetic member 18 is generally flush with the bottom surface 22 of the resilient member 16 to form an enlarged planar surface 52 when the magnetic member 18 is arranged within the recess 20. Since most commonly used magnetic materials are quite brittle, the magnetic member 18 can be spaced apart from the bottom surface 22 and inner circumferential edge 40 of the lower portion 26 of the resilient member 16 when arranged within the recess 20 to minimize the likelihood of the magnetic member 18 fracturing when in use. Moreover, the upper and lower portions 24, 26 can be formed as a continuous resilient member 16 without a defined interior 32 or top surface 38.

Figure 8:
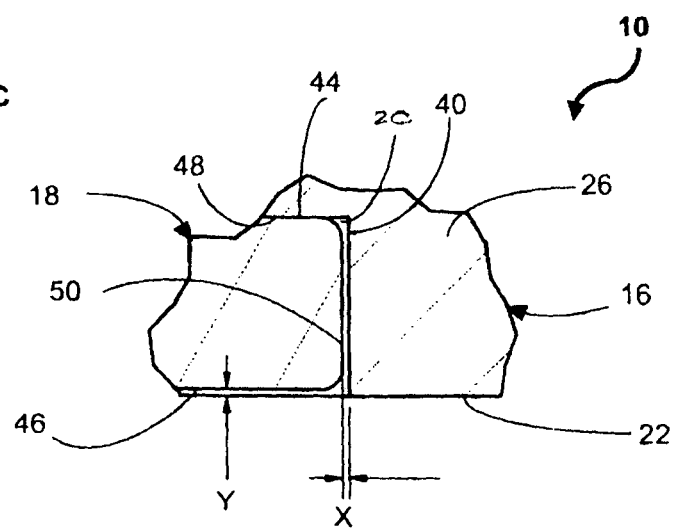
FIG. 8 is a sectional view of the magnetic wear saving device along the detail C-C of FIG. 7.
Figure 12:
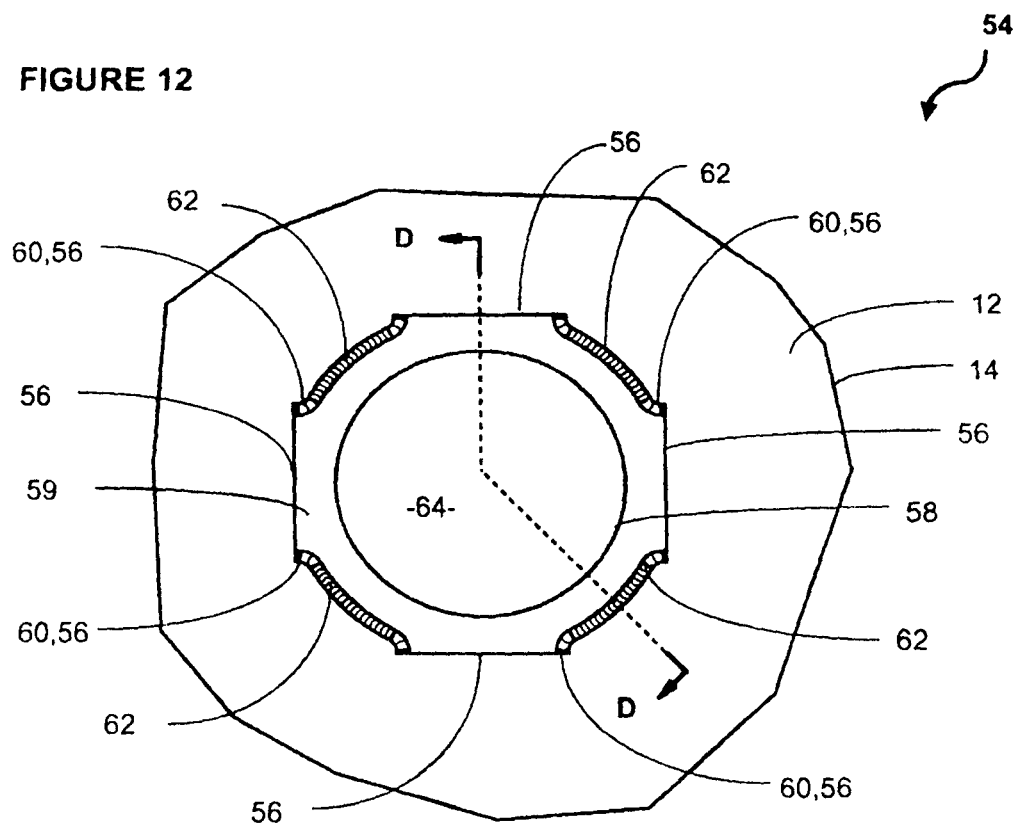
FIG. 12 is a plan view of the shear plate secured to the wear surface of the material handling device by one or more fillet welds.
Figure 13:
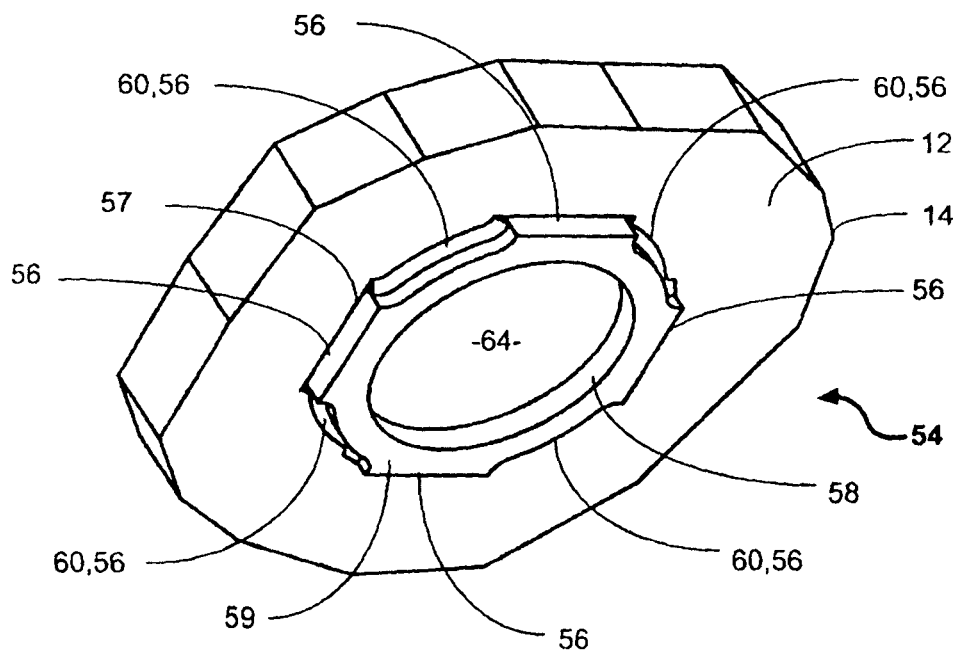
FIG. 13 is a front perspective of the shear plate of FIG. 12.
Figure 14:
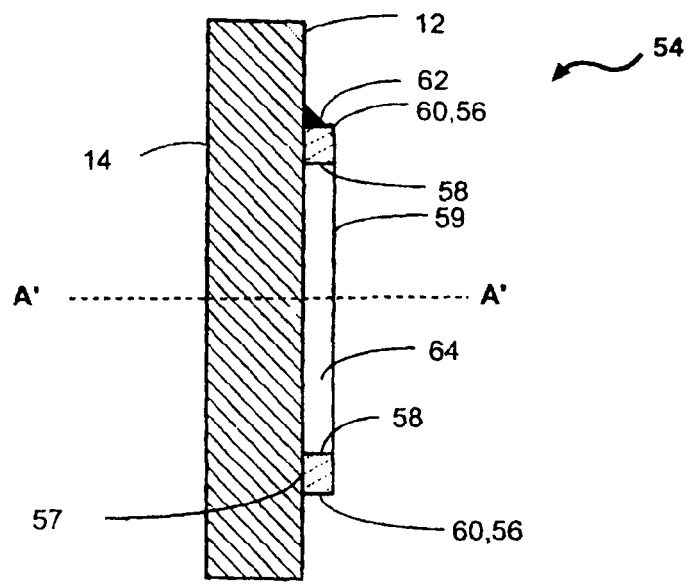
FIG. 14 is a sectional view of the subject shear plate along line D-D of FIG. 12.

As shown in the cross-sectional views of the magnetic wear saving device 10 in FIGS. 7 and 8, the circumferential magnetic edge 50 of the magnetic member 18 can be spaced apart from the inner circumferential edge 40 by a distance X. Preferably, the distance X is less than 1.0 millimeters or approximately 0.04 inches. Most preferably, the distance X is less than 0.5 millimeters or approximately 0.02 inches. Similarly, the outer magnetic surface 46 is preferably spaced apart from the bottom surface 22 of the resilient member 16 by a distance Y. Preferably, the distance Y is less than 1.0 millimeters (or approximately 0.04 inches). Most preferably, the distance Y is less than 0.5 millimeters (or approximately 0.02 inches). By this design, the likelihood of the magnetic member 18 fracturing against the resilient member 16 and/or the wear surface 12 due to an abrasive or impact force will be minimized, while the magnetic attraction between the outer magnetic surface 46 and the wear surface 12 is maximized.

The magnet member 18 may be manufactured from any suitable magnetic material capable of securing the magnetic wear saving device 10 to the wear surface 12 of the material handling device 14. Preferably, the magnet member 18 is manufactured from a rare earth neodymium-iron boron (nd2Fe14B) magnetic material. The magnetic member 18 will also possess adequate magnetic attractive forces to secure the magnet wear device 10 to the desired wear surface 12 and to minimize the undesirable movement of the magnetic wear saving device 10 substantially about the wear surface 12. Moreover, the magnetic member 18 is adapted to possess adequate magnetic attractive forces in relation to the resilient member 16 to retain the magnetic member 18 within the recess 20. It should be understood that the magnet member 18 may alternatively or additionally be held in the recess 20 using set screws arranged through the outer and inner circumferential edges 28, 40, or any other fastening means known or hereafter developed.

While the magnetic wear saving device 10 is depicted as being generally circular or disc-shaped in FIGS. 1-9, it should be understood that the magnetic wear saving device 10 may comprise any shape, such as for example, elliptical, rectangular, wedge or square. By this design, the magnetic wear saving devices 10 may be positioned in a mosaic or arranged together to provide protective coverage over a larger area of the wear surface. For applications in rectangular-shaped material handling devices 14, chutes or conveyor belts, it may be more advantageous to apply a plurality of rectangular magnetic wear saving devices 10 in a side-by-side configuration to ensure substantial coverage of the desired wear surface.

Figure 15:
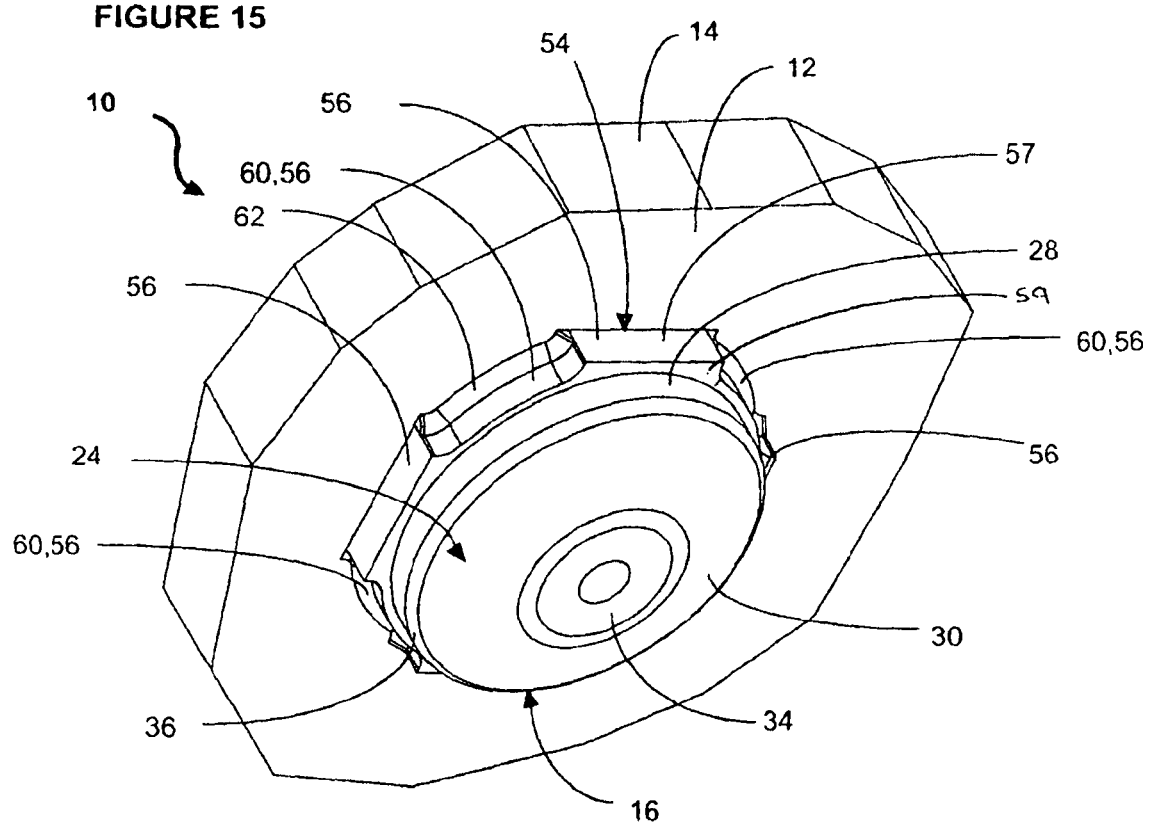
FIG. 15 is a front perspective of the magnetic wear saving device arranged within the shear plate of FIG. 13.

In FIGS. 9-15, the magnetic wear saving device 10 is shown positioned generally within a shear plate 54 to provide the stability of the magnetic wear saving device 10 on the wear surface 12. In FIGS. 9, 10 and 12-14, the shear plate 54 has a generally octagonal shape having an outer edge 56 and an inner circular edge 58. The shear plate 54 further comprises a bottom shear surface 57 for positioning the shear plate 54 adjacent to the wear surface 12 of the material handling device 14 and a top shear surface 59 positionable adjacent to the resilient member 16 of the magnetic wear saving device 10. As can be seen in FIG. 15 the shear plate 54 is thinner than the wear saving device 10. The magnetic wear saving device has a first thickness T1, and the shear plate has a reduced thickness T2, which is less than T1. The outer edge 56 of the shear plate is constructed with one or more notched edges 60 which may be spaced at intervals along the outer edge 56 to facilitate the welding or attachment of the shear plate 54 to the wear surface 12 of the material handling device 14. The size and configuration of the notched edges 60 should be sufficient to enable one or more fillet welds 62 to be applied between the shear plate 54 and the wear surface 12 and secure the position of the shear plate 54 in relation to the wear surface 12. By this design, the fillet welds 62 will not significantly extend beyond the outer edge 56 of the shear plate 54 and interfere with the positioning of adjacent shear plates 54 and magnetic wear saving devices 10 in mining and construction applications. It should be understood that the outer circumferential edge 28 of the resilient member 16 can be designed to extend radially beyond the outer edge 56 of the shear plate 54, as at 28*a* in FIG. 7. This will provide protection against the abrasive or impact forces in mining and construction applications from damaging the shear plate 54 and/or fillet welds 62.

In FIGS. 9-11, the inner circular edge 58 defines an aperture 64 having a central axis A'-A' forming the center of the shear plate 54 and which is aligned with the central axis A-A of the resilient member 16 when used in conjunction with the magnetic wear saving device 10. The inner circular edge 58 has a generally similar size and configuration like that of the outer circumferential edge 28 of the resilient member 16 of the magnetic wear saving device 10. The lower body portion 26 and the magnetic member 18 are then aligned with the aperture 64, such that the outer circumferential edge 28 is positioned adjacent to and generally parallel to the inner circular edge 58 of the shear plate 54.

The shear plate 54 may be manufactured from steel, iron or polyurethane, or any other protective material that is capable of being welded, brazed or secured by any other means using any other fastening means known or hereafter developed to the wear surface 12 of the material handling device 14.

In FIGS. 16-23, a modified magnetic wear saving device 10 is shown constructed with a release means 68 to facilitate the removal and replacement of the magnetic wear saving device 10 from the wear surface 12 of the material handling device 14. The release means 68 includes a cylinder member 70 and a jack screw 72 which is adapted to be received in the cylinder member 70. FIGS. 16 and 17 show a cross-sectional view of the magnetic wear saving device 10 with the cylinder member 70 provided in a bore 74 formed through the resilient member 16 and the magnetic member 18 along the central axis A-A. The bore 74 consists of an upper bore 76 and a lower bore 78 which has a greater cross-sectional area than the upper bore 76. The upper bore 76 extends through the resilient member 16 along the central axis A-A. The lower bore 78 extends through the magnetic member 18 along the central axis A-A and aligns and communicates with the upper bore 76.

Figure 19:
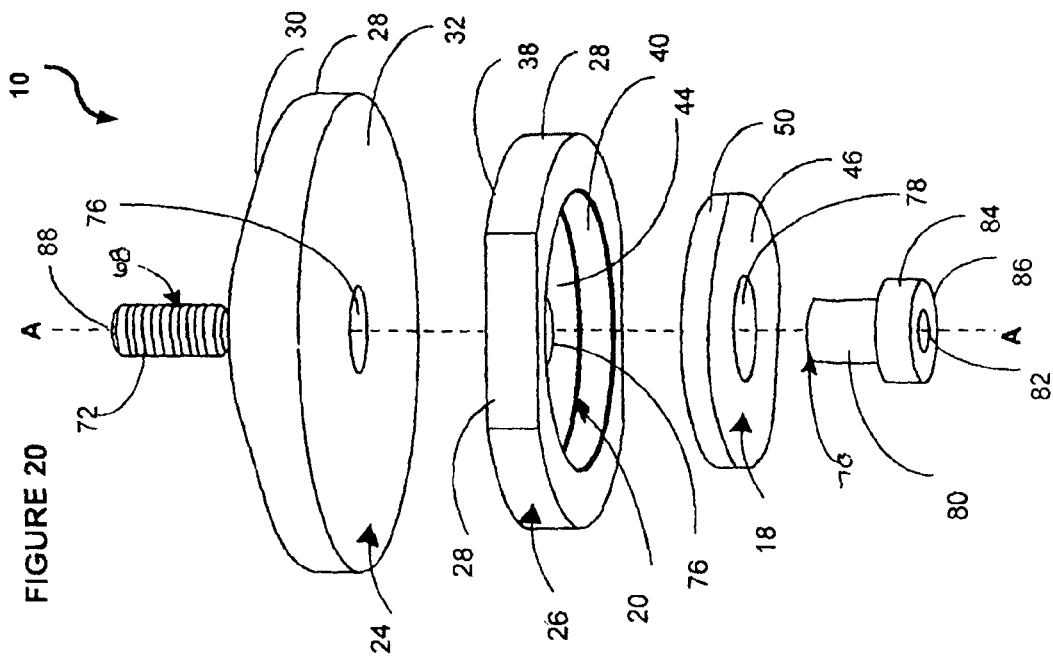
FIG. 19 is a top perspective exploded view of the components of the magnetic wear saving device in accordance with the third embodiment of the present invention.
Figure 20:
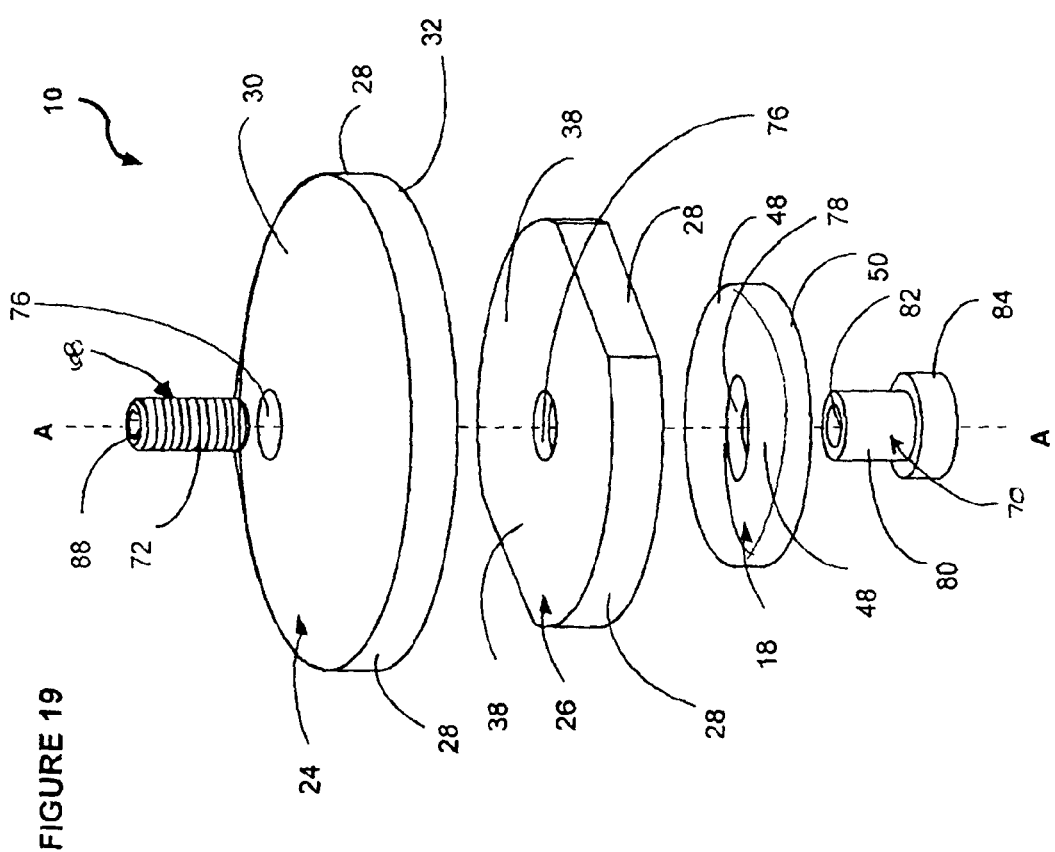
FIG. 20 is a bottom perspective exploded view of the components of the magnetic wear saving device in accordance with the third embodiment of the present invention.

As shown in FIGS. 17, 19 and 20, the cylinder member 70 has a tubular body 80 formed with a threaded interior 82. The tubular body 80 is adapted to be inserted into the bore 74 through the outer magnetic surface 46. The cylinder member 70 also has an outer flange 84 extending from the tubular body 80 which is received within the lower bore 78 when the cylinder member 70 is inserted into the bore 74. The length of the cylinder member 70 is dimensioned such that a lower end 86 thereof abuts the wear surface 12 of the material handling device 14 when the release means 68 is inserted into the bore 74 and the magnetic wear saving device 10 is operatively positioned against the wear surface 12 in use. Moreover, the size and configuration of the tubular body 80 and the outer flange 84 should be sufficient to enable the cylinder member 70 to be press fit within the upper and lower bores 76, 78, respectively.

As shown in FIGS. 16, 17, and 19-21, once the cylinder member 70 has been positioned within the bore 74, the jack screw 72 may be threadably advanced through the planar top edge 34 of the resilient member 16 and the upper bore 76 into the threaded interior 82 of the tubular body 80. The threaded interior 82 of the tubular body 80 has a size and configuration to permit the threaded pass through of the jack screw 72 along the bore 74. As shown in particularly in FIG. 21, a first end 88 of the jack screw 72 is constructed with a nut or other non-circular end portion which may be manipulated by an advancing tool, such as a wrench, socket or any other suitable tool known or hereafter developed (not shown).

Figure 24:
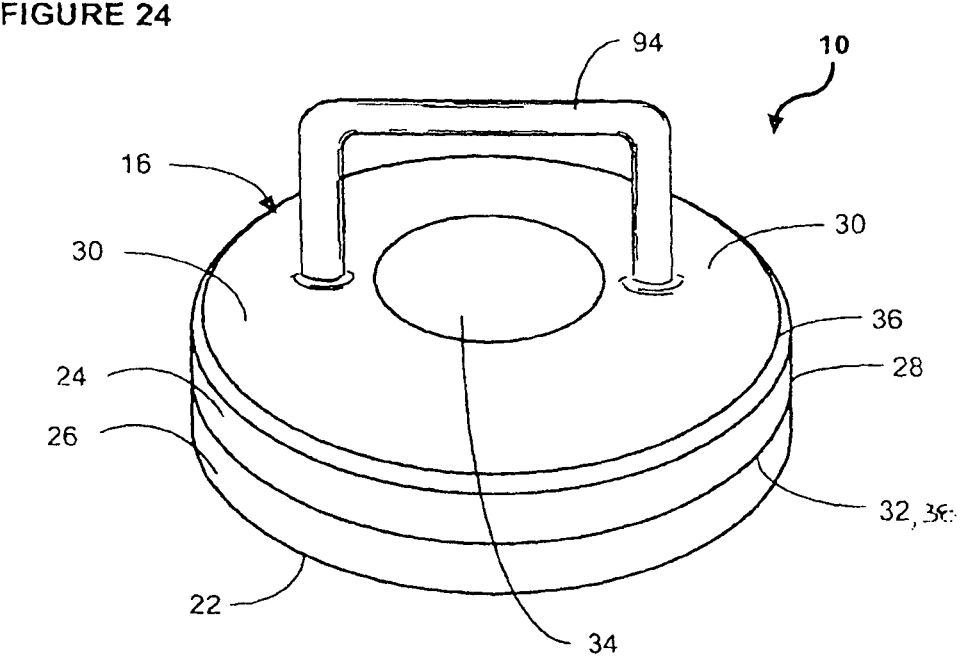
FIG. 24 is a front perspective view of the magnetic wear saving device of FIG. 2 showing a handle means extending from the exterior surface of the resilient member.

As shown in FIGS. 22 and 23, the threaded advancement of the jack screw 72 along the threaded interior 82 causes a second end 92 of the jack screw 72 to contact the wear surface 12 of the material handing device 14 and draw the magnetic wear saving device 10 away from the wear surface 12. As the magnetic wear saving device 10 is drawn further away from the wear surface 12, the magnetic attraction between the magnetic member 18 and the wear surface 12 is progressively weakened, thereby enabling the magnetic wear saving device 10 to be manually removed from the material handling device 14. If desired, the manipulation of the advancing tool may continue until the magnetic wear saving device 10 has been completely removed from the wear surface 12. As shown in FIG. 24, it should be understood that the magnetic wear saving device 10 may alternatively or additionally be removed from the wear surface 12 by a user grasping a handle member 94 integrally formed into the magnetic wear saving device 10 and extending from the exterior surface 30 of the resilient member 16. It should be further understood that the magnetic wear saving device 10 may alternatively or additionally be removed from the wear surface 12 of a material handling device 14 using a secondary external magnet means, a heat means or pry bar means (not shown) capable of sufficiently weakening the magnetic attraction between the magnetic member 18 and the wear surface 12 to permit the magnetic wear saving device 10 to be removed from the material handling device 14.

The use of the magnetic wear saving device 10 of the present invention will now be described with reference to the figures. As shown in FIGS. 5 and 6, the upper and lower portions 24, 26 of the resilient member 16 are brazed or bonded together at the interior surface 32 and the top surface 38, respectively. Alternatively the resilient member 16 may be formed as a unitary member eliminating the need for brazing or bonding the upper and lower portions 24, 26 together. The magnetic member 18 is arranged within the recess 20 in the bottom surface 22 of the lower portion 24 subsequent to the forming of the resilient member 16. The magnetic member 18 is retained within the recess 20 as a result of the attraction between the magnetic material within the magnet member 18 and the ferromagnetic characteristics of the resilient member 16. Alternatively or additionally, the magnetic member 18 can be retained within the recess 20 using set screws which are arranged through openings in the outer and inner circumferential edges 28, 40 and which engage against the circumferential magnetic edge 50. The bottom and outer magnetic surfaces 22, 46 of the resilient and magnetic members 16, 18, respectively, can then be positioned generally adjacent to the desired wear surface 12 on the material handling device 14 which requires protection from abrasive and impact forces in mining and construction applications. The bottom and outer magnetic surfaces 22, 46 are then gently advanced towards the wear surface 12 and the magnetic wear saving device 10 is caused to become magnetically attracted and secured to the material handling device 16 (as shown in FIG. 1). Once secured to the wear surface 12, the wear saving device 10 provides protective coverage for the wear surface, saving it from abrasion and damage.

The magnetic wear saving device 10 may be removed from the material handling device 16 and repositioned using the handle member 94 (shown in FIG. 24), a pry bar, heating element or the release means 68.

When using the magnetic wear saving device 10 in conjunction with the release means 68, it would now be necessary to insert the cylinder member 70 into the bore 74 formed through resilient and magnetic members 16, 18. More particularly, the tubular body 80 of the cylinder member 70 is press fit into the bore 74 through the outer magnetic surface 46 until the outer flange 84 of the cylinder member 70 is received within the lower bore 78. The jack screw 72 may then be inserted into the upper bore 76 and threadably advanced along the threaded interior 82 of the tubular body 80 until the second end 92 of the jack screw 72 is proximate to the outer magnetic surface 46 of the magnetic member 18. The advancement of the jack screw 72 along the tubular body 80 is achieved by manipulating an advancing tool which engages with the first end 88 of the jack screw 72. The jack screw 72 can be advanced along the tubular body 80 beyond the outer magnetic surface 46 of the magnetic member 18 so as to enable the magnetic wear saving device 10 to be gently positioned against the wear surface 12 as the jack screw 72 is withdrawn back into the tubular body 80. Alternatively, the jack screw 72 can be advanced within the tubular body 80 proximate to but not beyond the outer magnetic surface 46. In this manner, the jack screw 72 can then be threadably advanced along the tubular body 80 until the second end 92 contacts the wear surface 12 of the material handling device 14. Any further advancement of the jack screw 72 within the tubular body 80 would then cause the magnetic wear saving device 10 to become disengaged from the wear surface 12.

When used in mining and construction applications experiencing higher shear forces, the magnetic wear saving device 10 can be used in conjunction with the shear plate 54. Before securing the magnetic wear saving device 10 to the material handling device 14, the aperture 64 of the shear plate 54 is positioned over the desired wear surface 12 in order to be protected. Once situated in the correct position, the outer edge 56 of the shear plate 54 is then fillet welded to the wear surface 12 to secure the shear plate 54. The outer circumferential edge 28 of the resilient member 16 is then generally aligned with the inner circular edge 58 of the shear plate 54 and gently advanced into the aperture 64 and towards the wear surface 12 of the material handling device 14. The magnetic attraction between the outer magnetic surface 46 of the magnetic member 18 and the wear surface 12 will cause the magnetic wear saving device 10 to become magnetically secured to the material handling device 14 within the aperture 64.

In a further embodiment shown in FIG. 25 the shear plates can be incorporated integrally in the wear surface, of for example a shovel, or a conveyor.

In this case the wear surface 90 is formed with a large plurality of integral recesses or depressions 92, spaced apart over the wear surface. The wear surface 90 thus functions as a unitary shear plate. These depressions are preferably circular, and have a depth about the same as the thickness of the shear plates (above). They may be formed typically by being cast in place, or by stamping or forging or any other suitable manufacturing technique.

The magnetic wear saving devices will be placed in the recesses, with their upper portions extending out of the recesses, so as to receive the abrasions from the material being handled. Typically this embodiment will be used on the wear surfaces of conveyor equipment, but is applicable to shovels and the like where required.

A further embodiment is shown in FIG. 26. In this case the separate shear plates are replaced by a single larger plate 96, functioning as a unitary shear plate. individual recesses 98 are cut or stamped or otherwise formed in the plate, to receive individual magnetic wear saving devices. Such a plate 96 may cover substantially the entire extent of the wear surface, or there may be two or more such plates, which can cover various sections of the wear surface.

The plate 96 may be attached for example by welds such as 100 shown spaced around the plate. Notches 102 may be formed in the plate 96, (or in the wear surface 90 above), to assist in removing the magnetic wear saving devices from their recesses. This may require a pry bar or lever (not shown)

While what has been shown and described herein constitutes a preferred embodiment of the subject invention, it should be understood that various modifications and adaptations of such embodiment can be made without departing from the present invention, the scope of which is defined in the appended claims.

The invention claimed is:

1. A magnetic wear saving device providing a sacrificial portion for protecting a wear surface on a material handling device, comprising:
   a resilient member of a sacrificial material having an upper portion and a lower portion integrally formed together, said upper portion having a top exterior surface, said lower portion having a bottom surface for contacting with the wear surface of said material handling device, said bottom surface formed with a recess;
   a magnetic member received with in said recess and coupled to said resilient member, said magnetic member having an outer magnetic surface for releasably securing said resilient member to said wear surface of said material handling device; and,
   a shear plate defining at least one recess for receiving a said magnetic wear saving device therein, said shear plate being adapted to be attached to said wear surface, to resist shear forces applied to said magnetic wear saving devices, by contact with material, in use.

2. The magnetic wear saving device as claimed in claim 1, wherein a central axis of said resilient member is aligned with a central axis of said magnetic member.

3. The magnetic wear saving device as claimed in claim 1, wherein said upper portion and said lower portion are adapted to be fixedly connected to each other.

4. The magnetic wear saving device as claimed in claim 1, said upper portion having an interior surface formed inwardly of said exterior surface, said lower portion having a top surface formed inwardly of said bottom surface and adjacent to said interior surface of said upper portion.

5. The magnetic wear saving device as claimed in claim 4, wherein said upper portion has a generally dome-like configuration formed by said exterior surface extending radially outwardly from a planar top edge to said outer circumferential edge.

6. The magnetic wear saving device as claimed in claim 4, wherein said lower portion has a generally annular configuration formed by an inner circumferential edge and said outer circumferential edge, said inner circumferential edge defining an opening of said recess and terminating at a planar recessed surface.

7. The magnetic wear saving device as claimed in claim 6, wherein said magnetic member has a generally cylindrical shape constructed with an outer magnetic surface, an inner magnetic surface and a circumferential magnetic edge, said outer magnetic surface is positioned parallel to said wear surface, said inner magnetic surface is positioned parallel to said recessed surface, and said circumferential magnetic edge is positioned parallel to said inner circumferential edge of said lower portion.

8. The magnetic wear saving device as claimed in claim 7, wherein said circumferential magnetic edge is spaced apart from said inner circumferential edge of said lower portion a distance less than 1.0 millimeters.

9. The magnetic wear saving device as claimed in claim 1, wherein said resilient member having a generally cylindrical outer circumferential edge extending from said exterior surface of said upper portion to said bottom surface of said lower portion.

10. The magnetic wear saving device as claimed in claim 1, further comprising said shear plate having an outer edge and an inner circular edge, said outer edge is adapted to be secured to said wear surface of said material handling device, said inner circular edge defining an aperture for at least partially receiving said resilient member and said magnetic member therein.

11. The magnetic wear saving device as claimed in claim 10, wherein said outer edge formed with one or more notched edges along, said one or more notched edges being dimensioned to receive one or more fillet welds, said fillet welds secure said one or more notched edges to said wear surface of said material handling device.

12. The magnetic wear saving device as claimed in claim 10, wherein said shear plate having a bottom shear surface for positioning said shear plate adjacent to said wear surface of said material handling device, and a top shear surface for positioning said shear plate adjacent to said resilient member of said magnetic wear saving device.

13. The magnetic wear saving device as claimed in claim 1, further comprising a release means provided within a bore formed through and along the central axes of said resilient member and said magnetic member, said release means including a cylinder member and a jack screw adapted to be threadably received within said cylinder member.

14. The magnetic wear saving device as claimed in claim 13, wherein said bore includes an upper bore and a lower bore having a greater cross-sectional area than said upper bore, said upper bore extending through said resilient member, said lower bore extending through said magnetic member.

15. The magnetic wear saving device as claimed in claim 14, wherein said cylinder member includes a tubular body having a threaded interior and an outer flange extending from said tubular body, said tubular body being dimensioned to be received within said upper bore, said outer flange being dimensioned to be received within said lower bore.

16. The magnetic wear saving device as claimed in claim 15, wherein said jack screw is inserted into said upper bore and threadably advanced along said threaded interior of said tubular body towards said lower bore, whereby the advancement of said jack screw along said threaded interior and into said wear surface removes said magnetic wear saving device from said material handling device.

17. The magnetic wear saving device as claimed in claim 1 wherein said wear surface is formed with a plurality of integral depressions spaced apart there across, dimensioned to provide respective shear plate recesses to receive respective magnetic wear saving devices therein.

18. The magnetic wear saving device as claimed in claim 1 wherein said shear plate is formed as a unitary shear plate, and including separate spaced apart recesses formed in said unitary plate, said recesses being shaped and dimensioned to receive individual respective magnetic wear saving devices therein, and said unitary shear plate being adapted to be attached to a said wear surface.

19. The magnetic wear saving device as claimed in claim 18 and including notches formed in said shear plate adjacent respective said recesses for receiving a tool therein for removal of said magnetic wear saving devices.

* * * * *